United States Patent [19]

Lau

[11] Patent Number: 4,835,763
[45] Date of Patent: May 30, 1989

[54] SURVIVABLE RING NETWORK

[75] Inventor: Chi-Leung Lau, Eatontown, N.J.

[73] Assignee: Bell Communications Research, Inc., Livingston, N.J.

[21] Appl. No.: 152,238

[22] Filed: Feb. 4, 1988

[51] Int. Cl.⁴ .............................. H04J 1/16; H04J 3/14
[52] U.S. Cl. ......................................... 370/16; 370/88
[58] Field of Search ...................... 370/13, 16, 88, 84, 370/89, 95; 371/8, 11

[56] References Cited

U.S. PATENT DOCUMENTS

| | | | |
|---|---|---|---|
| Re. 28,958 | 9/1976 | Zafiropulo et al. | 340/147 SC |
| 3,652,798 | 3/1972 | McNeilly et al. | 179/15 AL |
| 4,370,744 | 1/1983 | Hirano et al. | 370/88 |
| 4,501,021 | 2/1985 | Weiss | 455/601 |
| 4,527,270 | 7/1985 | Sweeton | 371/11 |
| 4,530,085 | 7/1985 | Hamada et al. | 370/15 |
| 4,542,496 | 9/1985 | Takeyama et al. | 370/16 |
| 4,542,502 | 8/1985 | Levinson et al. | 370/88 |
| 4,553,233 | 11/1985 | Debuysscher et al. | 370/16 |
| 4,554,659 | 11/1985 | Blood et al. | 370/88 |
| 4,633,246 | 12/1986 | Jones et al. | 340/825.05 |
| 4,648,088 | 3/1987 | Cagle et al. | 370/16 |
| 4,683,563 | 7/1987 | Rouse et al. | 370/16 |
| 4,710,915 | 12/1987 | Kitahara | 370/16 |

Primary Examiner—Benedict V. Safourek
Assistant Examiner—Wellington Chin
Attorney, Agent, or Firm—James W. Falk; John T. Peoples

[57] ABSTRACT

A survivable ring network is disclosed that can withstand a cut link or failed node, without the need for a central controller or protection switching among links. The disclosed invention comprises two rings carrying identical multiplexed node-to-node communications in opposite directions. When a system error is detected in a downstream node, error signals are inserted in all subrate channels. Each subrate channel receiver receives identical communications from each ring. If one subrate channel has an error signal, the receiver selects the alternate channel.

8 Claims, 4 Drawing Sheets

HYBRID RING

HYBRID RINGS WITH CUTS

SURVIVABLE RING NETWORK

FIELD OF THE INVENTION

The invention relates generally to a communications network. Specifically, it relates to a self-healing ring network.

BACKGROUND OF THE INVENTION

A ring communications network is made up of nodes that are connected in tandem by a unidirectional communications path. Each node receives transmissions from the adjacent upstream node, and if the communication is destined for a downstream node, the communication is re-transmitted to the adjacent downstream node. Otherwise, each node transmits its own communications to the adjacent downstream node.

A drawback of such a network is that a break in the ring would prevent any node upstream of the break from communicating with any node downstream of the break. Similarly, the complete failure of a node would have the same effect as a break in the ring.

Many designs have been proposed to minimize these difficulties. The most common approach is to provide a second communications ring parallel to the first. In that case, a fault in one ring could be bypassed by transferring communications to the second ring. Alternatively, if the second ring transmitted in the opposite direction as the first, a break in both rings between two adjacent nodes could be remedied by the nodes on either side of the break looping back communications received on one ring onto the other ring. Such a system is described in McNeilly et al, U.S. Pat. No. 3,652,798.

The main problem with such approaches is that the equipment required to detect and locate a fault, and then appropriately reconnect transmitters and receivers with the alternate ring, is complicated and costly.

SUMMARY OF THE INVENTION

These and other difficulties are alleviated by my invention. A subrate multiplexed signal is utilized for ring communications. Each node has the capability of demultiplexing the main signal into its constituent subrates (channels), and channels destined for that node (local channels) are sent to receiving equipment within the node, while channels destined for downstream nodes (through channels) are multiplexed with originating local channels, and the resultant high level signal is transmitted to the adjacent downstream node. This process is simultaneously performed using identical equipment in the node for a second ring transmitting in the opposite direction. If a node detects a fault in an incoming line, an error signal is placed on all of the channels following the demultiplexing. The receiving equipment in each node includes a selector which monitors the communications arriving on each local channel from both rings. If an error signal is detected on a local channel, the selector selects the communication from the associated channel of the other ring to send to the receiver.

In this way, a break in both rings between two adjacent nodes will not cause a failure in the system, and no complicated fault locating and switching equipment is required to continue service. Similarly, the complete failure of a node will not destroy communications among the remaining nodes.

It should be noted that unlike prior survivable ring arrangements which maintain their ring characteristics following a fault, my invention ceases functioning as a ring if the ring is broken. However, as previously discussed, communications among the nodes is maintained following such a break. I therefore term my network a hybrid ring, since it normally operates as a ring, but does not operate as a ring following a break in the ring or the loss of a node.

DETAILED DESCRIPTION

Figure 1:
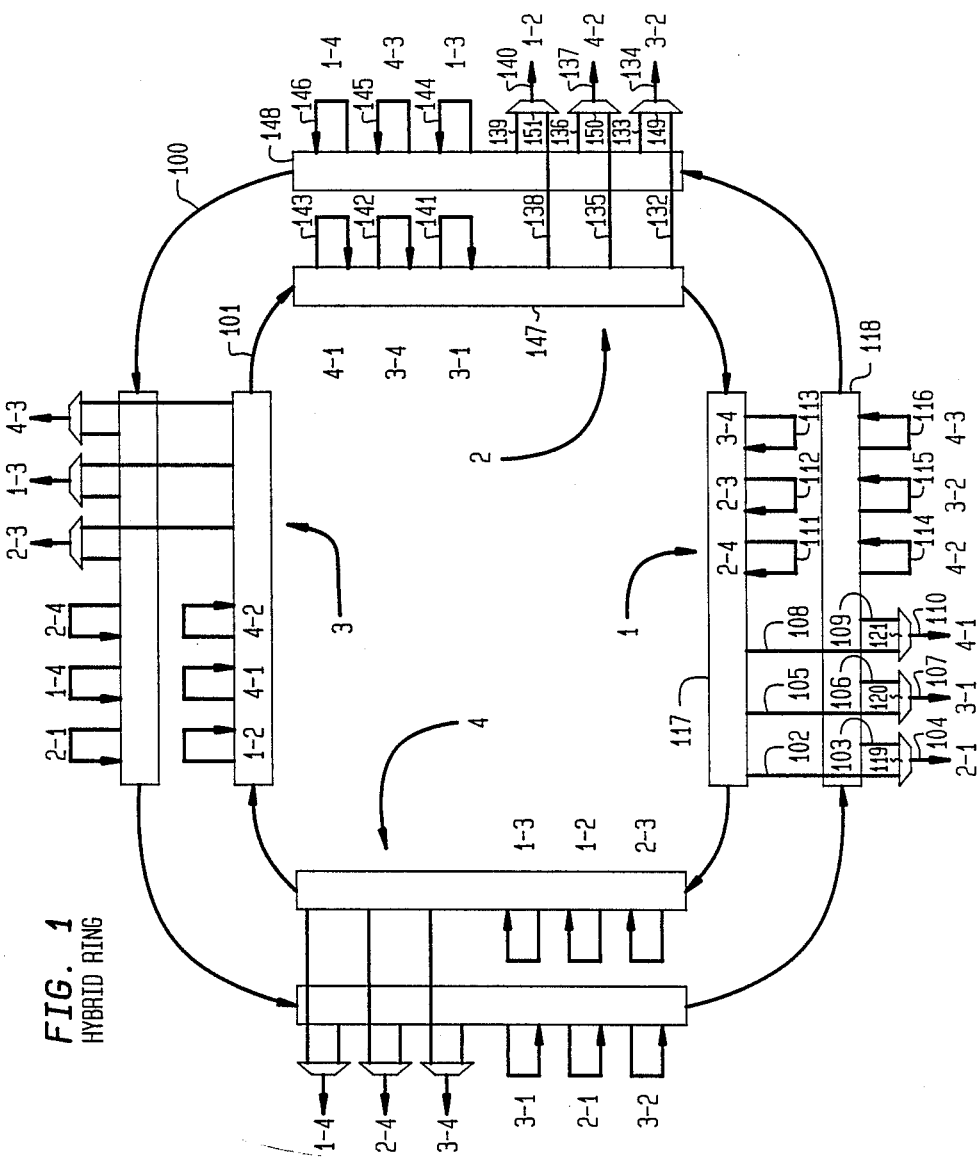
FIG. 1 is a diagram of the hybrid ring network.

An illustrative embodiment of my invention is depicted in FIG. 1. In discussing FIG. 1, it is helpful to have the background provided by the reference entitled "Draft of Amercian National Standard for Telecommunications Digital Hierarchy Optical Interface Rates and Formats Specifications" dated Dec. 11, 1987 as transmitted to the Secretariat of the Exchange Carriers Standards Association, $T_1$ Committee-Telecommunications. This reference is incorporated herein by reference. My invention is an improvement to the basic communication methodology discussed in this reference. Node 1 comprises controllers 117 and 118 and selectors 119-121. Controller 117 is connected with ring 101, which carries signals in a clockwise direction, and controller 118 is connected with ring 100, which carries signals in a counterclockwise direction. Illustratively, the signals on each ring comprise six subrate channels, each of which is dedicated to communications between a pre-selected pair of basically identical nodes. Each node feeds three subrate receivers (not shown), which in the case of node 1 have lines 104, 107 and 110, respectively, as input.

The channel carrying communications between nodes 1 and 2 would be extracted from ring 101 by controller 117 (by demultiplexing the signal on ring 101), and sent to selector 119 over line 102. Controller 118 would extract the associated channel off ring 100 and send it to selector 119 over line 103. Selector 119 would select one of the signals arriving on lines 102 and 103, based on the presence or absence of an error signal on either line. The selected signal would be sent to the receiver over line 104. A transmitter (not shown) would transmit two identical signals destined for node 2, one to controller 117 and one to controller 118, for reinsertion into the respective loops.

Channels associated with communications between nodes 3 and 1, and between nodes 4 and 1, would operate in a similar manner utilizing selectors 120 and 121, respectively. Controllers 117 and 118 then multiplex the three channels originating from node 1 with the three through channels, and transmit the resultant higher level signals on their associated loops (loop 101 toward node 4 and loop 100 toward node 2). In this way, each node has two redundant communications paths to each of the other nodes, both paths being continuously active.

Figure 2:
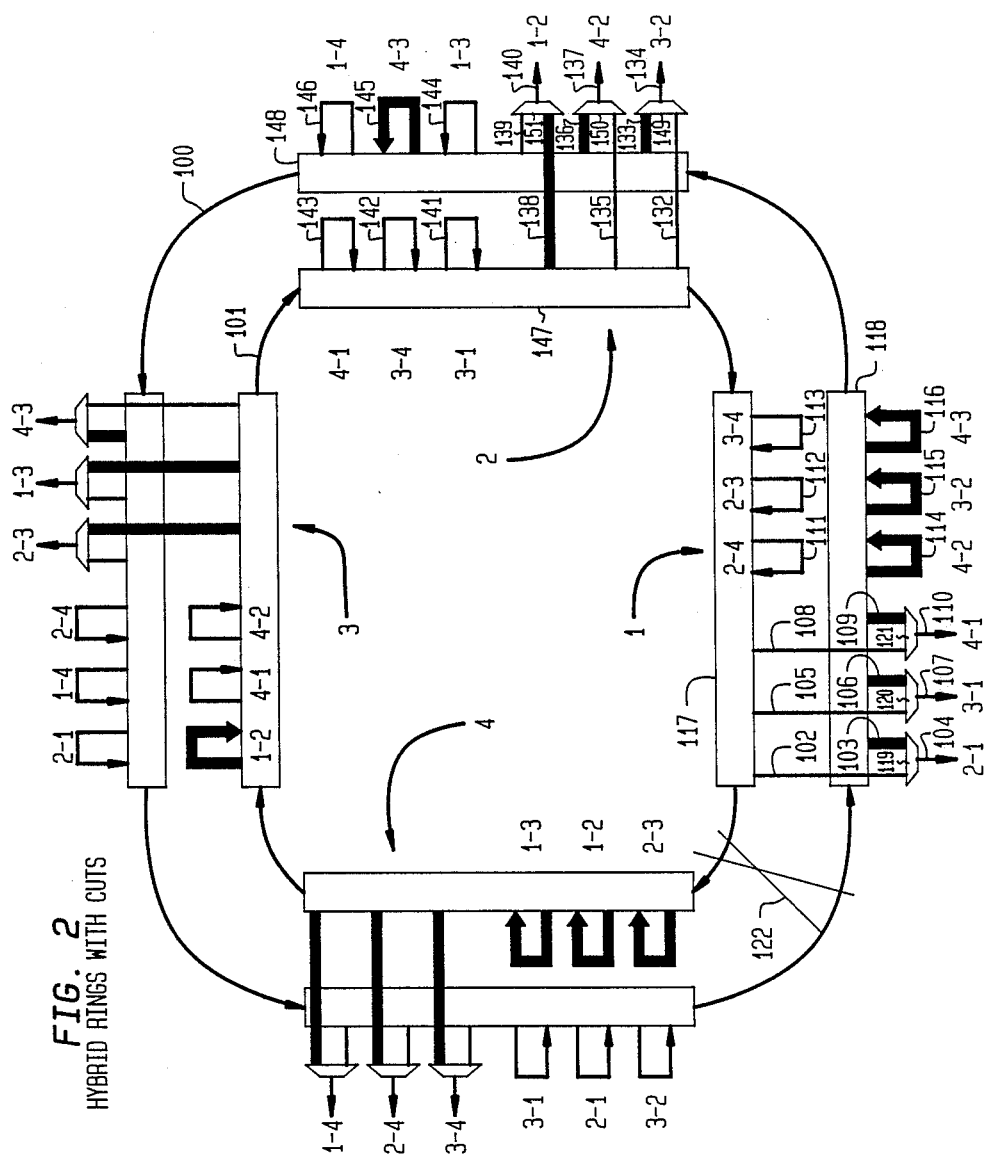
FIG. 2 is a diagram of the hybrid ring network with a break in both rings.

The simplicity and elegance of my invention becomes apparent when a break occurs in the rings, as shown in FIG. 2. If rings 100 and 101 are broken between node 1 and node 4, two simultaneous activities take place which will preserve communications paths among all of the nodes.

Each node continuously monitors and evaluates the integrity of the multiplexed subrate signals arriving at the node. Illustratively, this could be accomplished by detecting the absence of a carrier signal in an analog signal environment, or the lack of any incoming signal in a digital environment. When node 1 recognizes major line fault 122 in ring 100, controller 118 inserts an error signal onto the six subrate channels. This could illustratively be accomplished by inserting a string of 1's on each channel in a digital environment. Node 4 performs the identical activity by similarly placing an error signal on the six subrate channels of ring 101. After these two relatively simple procedures take place, the ring network otherwise operates normally.

In node 1, selector 119 chooses line 102 because line 103 has an error signal on it (designated by dashed line 103). Similarly, selector 120 selects line 105 because line 106 has an error signal, and selector 121 selects line 108 because line 109 contains an error signal. The three through channels on ring 100 that contain error signals are then multiplexed with the three local channels that now have valid data originating from node 1 and the higher level signal is transmitted to node 2 over ring 100.

Because the higher level signal arriving at node 2 on ring 100 appears normal, controller 148 demultiplexes the higher level signal into its six subrate channels, three of which terminate at node 2. The first local channel contains communications from node 3 to node 2. An error signal was generated on this channel at node 1. Controller 148 sends this error signal to selector 149 via line 133. Selector 149 therefore selects line 132 from controller 147, containing traffic from node 3 to node 2 over ring 101, which is not affected by break 122.

Similarly, selector 150 recognizes the error signal on line 136 and selects line 135. Selector 151 receives communications from node 1 over line 139 from ring 100 and receives an error signal over line 138 from ring 101. Therefor, selector 151 would select line 139.

Communications from node 1 to node 3 and from node 1 to node 4 are multiplexed from lines 144 and 146 by controller 148. Communications from node 4 to node 3 are also multiplexed from line 145 by controller 148, thereby passing along the error signal contained therein to node 3 over ring 100.

Each node operates in the above manner to insure continuity of communications among the nodes following a ring failure; or, as in the case of break 122, a multiple ring failure between two adjacent nodes. If a node fails, the same process will maintain communications among the remaining nodes.

It should be readily apparent that other techniques could be employed without departing from the scope of my invention, such as designating the destination node within each message, and having each node read the destination of each message passing through the node, and selecting messages destined for itself.

Figure 3:
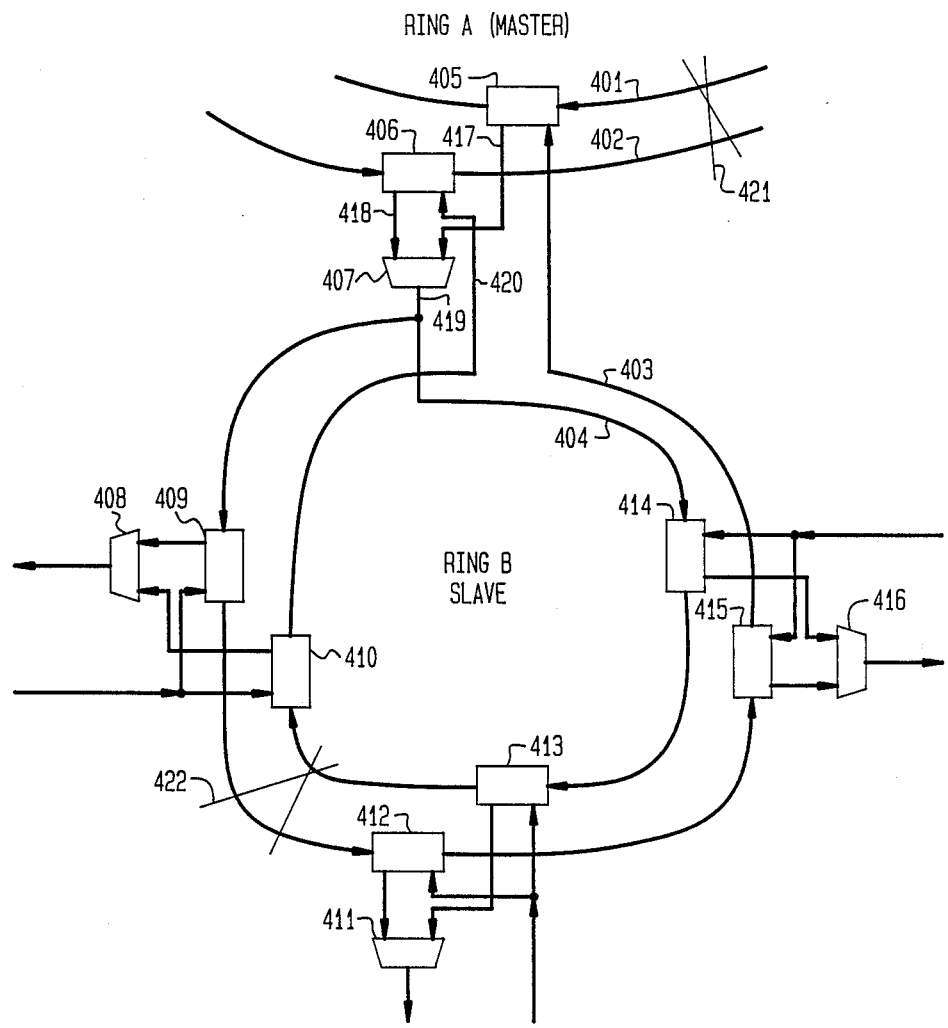
FIG. 3 is a diagram of a portion of a master/slave arrangement of two hybrid ring networks.

FIG. 3 depicts an embodiment of my invention wherein two ring sets are joined in a dual-ring configuration at a common node (gateway node). Ring arrangement A is designated the master ring and ring arrangement B is designated the slave ring. Controller 405 of the gateway node extracts a pre-selected subrate channel off ring 401 and sends the extracted channel to selector 407 over line 417. Controller 406 sends a similarly pre-selected subrate channel from ring 402 to selector 407 over line 418. Selector 407 chooses a non-error signal line for insertion onto slave rings 403 and 404 via line 419. In this way, any one break in the master rings 401 and 402 will not prevent a valid subrate channel from being inserted onto slave ring 403.

Controllers 409 and 410 insert and extract communications on rings 403 and 404, respectively, and selector 408 chooses a non-error signaled input. If, illustratively, break 422 occurs on rings 403 and 404, controllers 412 and 410 will insert error signals on associated subrate paths, and controllers 409, 413, 414 and 415 would operate as if no break occurred. Selectors 408, 411 and 416 would select inputs that do not contain error signals. It should be readily apparent that a two-ring break in either the master ring or the slave ring would not result in the loss of communications between any two nodes. However, simultaneous breaks in both the master and slave rings would result in selected communications losses.

Figure 4:
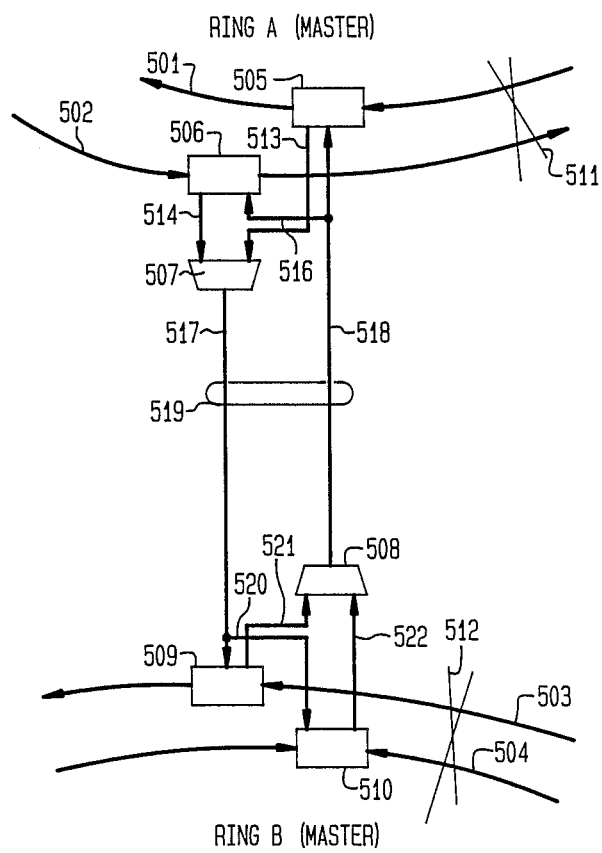
FIG. 4 is a diagram of a portion of a master/master arrangement of two hybrid ring networks.

FIG. 4 depicts two interrelated rings that can withstand simultaneous breaks in both rings without loss of communications between any two nodes, by employing a master-master relationship. Instead of one gateway node connecting the two rings, one node on each master ring is connected by link 519. Controllers 505 and 506 send a subrate communications channel to selector 507, and controllers 509 and 510 send a subrate communications channel to selector 508. If there is a break in ring A, selector 507 will select the non-error signal communication from line 513 or line 514 and transmit to ring B via line 517, and similarly, if there is a break in ring B, selector 508 will select the non-error signal communication from line 521 or 522 and transmit to ring A via line 518. It should be readily apparent that simultaneous breaks in both ring A and ring B will not result in the loss of communications between any two nodes.

My invention will work regardless of whether the ring networks are copper or fiber, and regardless of what higher rates and subrates are utilized. The dual ring embodiment depicted on FIG. 3 is most beneficially suited to multiple levels of subrating. For instance, in FIG. 3, if ring A carried a signal which could be demultiplexed into two subchannels by controllers 405 and 406, one subchannel could be sent to ring B by selector 407. Controllers 409–410 and 412–415 on ring B would then further demultiplex the subchannel for communications terminating at nodes on ring B.

Those ordinarily skilled in the art could make obvious modifications to my invention without departing from its scope.

What is claimed is:

1. In a communications network having a plurality of nodes interconnected in a ring configuration by a first ring which conveys multiplexed subrate communications around the first ring from node to node in one direction and a scond ring which conveys multiplexed subrate communications around the second ring from node to node in the other direction, each node including subrate transmitters with associated multiplexers and demultiplexers with associated subrate receivers, an improved node comprising
    monitoring means, associated with the first ring and the second ring, for evaluating the integrity of the multiplexed subrate communications on the first ring and the second ring, respectively, and
    insertion means, associated with the demultiplexers and said monitoring means, for inserting an error signal on designated ones of the subrate communications in response to said monitoring means detecting a lack of integrity on the multiplexed subrate communications on the first ring or the second ring or both the first ring and the second ring.

2. In the communications network of claim 1, the improved node further comprising selector means associated with the demultiplexers for selecting, in response to the detection of said error signal on one of the subrate communications, another of the subrate communications that does not contain said error signal.

3. In the communications network of claim 1, the improved node wherein the multiplexers multiplex selected subrate communications containing said error signal into a multiplexed subrate communication for transmission onto the first ring or the second ring or both in correspondence to said detection of said error signal.

4. A communications network having a plurality of nodes interconnected in a ring configuration by a first ring which conveys multiplexed subrate communications around the first ring from node to node in one direction and a second ring which conveys multiplexed subrate communications around the second ring from node to node in the other direction, each of said nodes including subrate transmitters and subrate receivers and further comprising:

monitoring means, associated with the first ring and the second ring, for evaluating the integrity of the multiplexed subrate communications on the associated first ring and the associated second ring, respectively, means for demultiplexing the multiplexed subrate communications on the associated first ring and the associated second ring into subchannels wherein at least one of said subchannels is sent to one of the corresponding receivers, insertion means associated with said demultiplexing means to insert an error signal on each of said subchannels in response to said monitoring means detecting a lack of integrity on the multiplexed subrate communications on the associated first ring or the associated second ring or both the associated first ring and the associated second ring, selector means associated with said demultiplexing means for selecting, in response to the detection of said error signal on one of the subchannels, one of the other subchannels, and multiplexing means for multiplexing subchannels and inserting multiplexed subrate communications onto the associated first ring and the associated seocnd ring, respectively.

5. A communications network having a first grouping of nodes interconnected by a first ring arrangement, a second grouping of nodes interconnected by a second ring arrangement, each ring arrangement conveying multiplexed subrate communications in a first direction from node to node and conveying multiplexed subrate communications in a second direction from node to node, and each node includes subrate transmitters with associated multiplexers and demultiplexers with associated receivers, and wherein each node comprises monitoring means, associated with the ring arrangement connected to said each node, for evaluating the integrity of the multiplexed subrate communications on said associated ring arrangement, insertion means, associated with its demultiplexers and its monitoring means, for inserting an error signal on designated ones of said subrate communications in response to said monitoring means detecting a lack of integrity on said multiplexed subrate communications on its said associated ring arrangement, and selector means, associated with its demultiplexers, for selecting, in response to the detection of said error signal on a subrate communication, a subrate communication that does not contain an error signal, and wherein a preselected node of the first ring arrangement comprises;

means, connected to the first ring arrangement and the second ring arrangement, for directing at least one subrate communication to the second ring arrangement and corresponding subrate communications from the second ring arrangement for multiplexing onto multiplexed subrate communications on the first ring arrangement.

6. The network of claim 5 wherein said subrate communication directed to the second ring arrangement is received by a preselected node of the second ring arrangement for multiplexing into multiplexed subrate communications around the second ring arrangement, and wherein the subrate communications directed to the first ring arrangement originates at said preselected node of the second ring arrangement.

7. In a communications network having a plurality of nodes interconnected in a ring configuration by a first ring which conveys multiplexed subrate communications around the first ring from node to node in one direction and a second ring which conveys multiplexed subrate communications around the second ring from node to node in the other direction, each node including subrate transmitters with associated multiplexers and demultiplexers with associated receivers, an improved method associated with each node comprising the steps of evaluating the integrity of the multiplexed subrate communications on the first ring and the second ring with monitoring means associated with both the first ring and the second ring, and inserting an error signal on designated ones of said subrate communications in response to said monitoring means detecting a lack of integrity on said multiplexed communications on the first ring or the second ring or both the first ring and the second ring.

8. The method as recited in claim 7 further comprising the step of selecting, in response to the detection of said error signal on said at least one of the subrate communications, another of the subrate communications that does not contain an error.

* * * * *

UNITED STATES PATENT AND TRADEMARK OFFICE
CERTIFICATE OF CORRECTION

PATENT NO. : 4,835,763

DATED : May 30, 1989

INVENTOR(S) : Chi-Leung Lau

It is certified that error appears in the above-identified patent and that said Letters Patent is hereby corrected as shown below:

Column 4, line 57, change "scond" to --second--.

Column 5, line 52, change "seocnd" to --second--.

Signed and Sealed this

Eighth Day of September, 1992

Attest:

DOUGLAS B. COMER

*Attesting Officer*    Acting Commissioner of Patents and Trademarks